United States Patent [19]

Haruch

[11] Patent Number: 5,673,859
[45] Date of Patent: Oct. 7, 1997

[54] ENHANCED EFFICIENCY NOZZLE FOR USE IN FLUIDIZED CATALYTIC CRACKING

[75] Inventor: James Haruch, Naperville, Ill.

[73] Assignee: Spraying Systems Co., Wheaton, Ill.

[21] Appl. No.: 354,614

[22] Filed: Dec. 13, 1994

[51] Int. Cl.$^6$ ............................ B05B 7/04; B05B 1/26
[52] U.S. Cl. .................................. 239/568; 239/434
[58] Field of Search ....................... 239/590.5, 432, 239/433, 434, 553, 553.5, 568, 601

[56] References Cited

U.S. PATENT DOCUMENTS

| | | | |
|---|---|---|---|
| 2,476,079 | 9/1949 | Benjamin, Jr. | 239/568 |
| 2,856,236 | 10/1958 | Hunziker | 239/568 |
| 4,349,156 | 9/1982 | Haruch | 239/432 |
| 4,567,934 | 2/1986 | Nakao et al. | 239/434 |
| 4,591,099 | 5/1986 | Emory et al. | |
| 4,790,485 | 12/1988 | Yamamoto | 239/568 |
| 4,815,665 | 3/1989 | Haruch | |
| 5,176,325 | 1/1993 | Viousek | 239/434 |
| 5,306,418 | 4/1994 | Dou et al. | |

FOREIGN PATENT DOCUMENTS 0 454 416 A2  10/1991  European Pat. Off.

*Primary Examiner*—Matthew C. Graham
*Attorney, Agent, or Firm*—Leydig, Voit & Mayer, Ltd.

[57] ABSTRACT

In fluidized catalytic cracking, enhanced efficiency is produced through the use of a spray nozzle having two transversely elongated discharge orifices for effecting fine atomization of liquid hydrocarbon feed as the latter is sprayed from the nozzle. The orifices preferably are inclined so as to produce a converging spray but can be inclined to produce a diverging spray or a substantially flat spray.

7 Claims, 1 Drawing Sheet

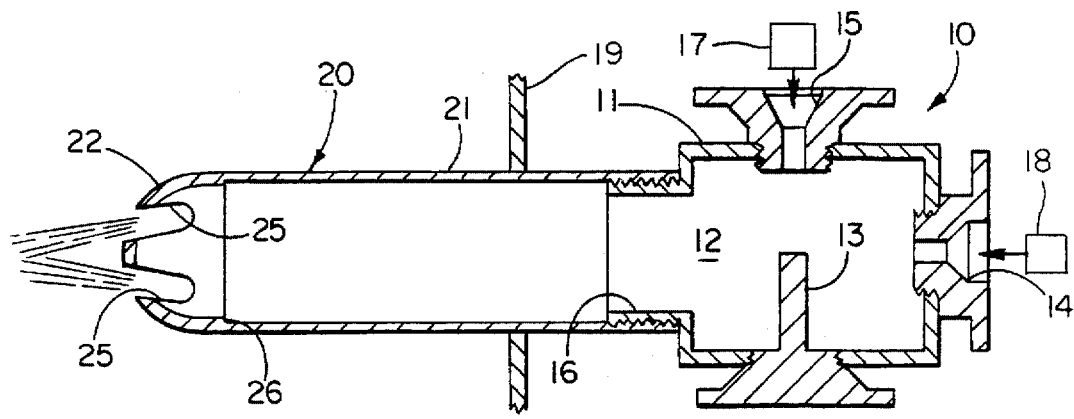
FIG. 1
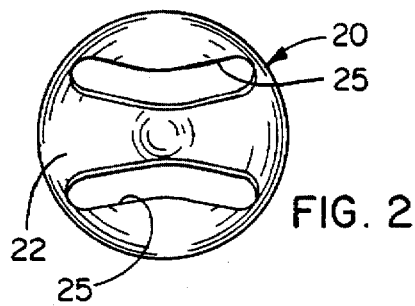
FIG. 2
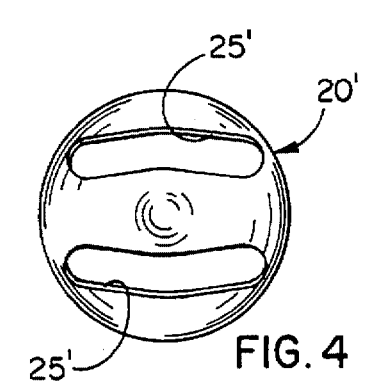
FIG. 4
FIG. 6
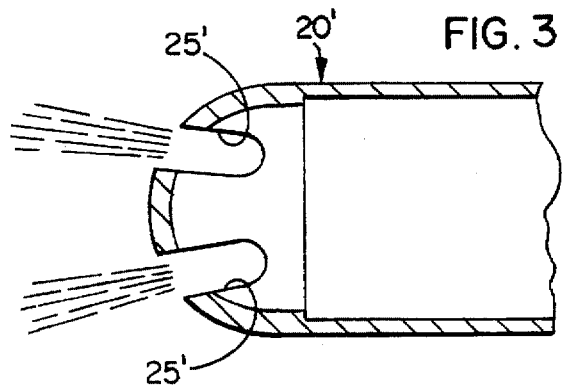
FIG. 3
FIG. 5

5,673,859

ENHANCED EFFICIENCY NOZZLE FOR USE IN FLUIDIZED CATALYTIC CRACKING

BACKGROUND OF THE INVENTION

This invention relates generally to atomizing and spraying apparatus and, more particularly, to apparatus for atomizing liquid feed to a fluidized catalytic cracking riser reactor.

Apparatus of this general type is shown and described in detail in Dou et al U.S. Pat. No. 5,306,418, the disclosure of which is incorporated herein by reference. In general, a liquid hydrocarbon feed is atomized by a gas such as steam and is discharged through a nozzle into the reactor. In the apparatus of the Dou et al patent, the preferred discharge nozzle has a generally hemispherical discharge end which is formed with a single elongated slot-like outlet orifice adapted to produce a flat fan-shaped spray.

A goal in atomizing and spraying apparatus is to achieve high efficiency. High efficiency in the context of the present apparatus refers to using as little steam energy as possible to break hydrocarbon feed of a given volume into particles having a large total surface area. Large surface areas are, of course, created by breaking the liquid into very fine particles.

SUMMARY OF THE INVENTION

The general aim of the present invention is to provide a new and improved nozzle of comparatively high efficiency for use in the fluidized catalytic cracking of hydrocarbon liquid.

A more detailed object of the invention is to achieve the foregoing through the provision of a nozzle having a plurality of slot-like outlets which atomize the liquid into finer particles as the liquid is discharged from the nozzle.

A further object is to angle the slot-like outlets relative to one another in such a manner as to produce a converging spray which itself effects post-discharge atomization of the liquid particles.

These and other objects and advantages of the invention will become more apparent from the following detailed description when taken in conjunction with the accompanying drawings.

BRIEF DESCRIPTION OF THE DRAWINGS

FIG. 1 is a cross-sectional view taken axially through catalytic cracking atomizing and spraying apparatus equipped with a new and improved nozzle incorporating the unique features of the present invention.

FIG. 2 is an enlarged end view of the nozzle shown in FIG. 1.

FIG. 3 is an enlarged fragmentary view generally similar to FIG. 1 but shows another embodiment of a nozzle according to the invention.

FIG. 4 is an end view of the nozzle shown in FIG. 3.

FIGS. 5 and 6 are views similar to FIGS. 3 and 4, respectively, but show yet another embodiment of a nozzle.

While the invention is susceptible of various modifications and alternative constructions, certain illustrated embodiments hereof have been shown in the drawings and will be described below in detail. It should be understood, however, that there is no intention to limit the invention to the specific forms disclosed, but on the contrary, the intention is to cover all modifications, alternative constructions and equivalents falling within the spirit and scope of the invention.

DETAILED DESCRIPTION OF THE PREFERRED EMBODIMENTS

For purposes of illustration, the invention has been shown in the drawings as incorporated in apparatus 10 for atomizing and spraying liquid. The apparatus is particularly useful for use in a fluidic catalytic cracking process for atomizing a liquid hydrocarbon feed injected into an FCC riser reactor 19. The aforementioned Dou et al patent contains a detailed disclosure of the use, in an FCC riser reactor, of apparatus of the same general type as the present apparatus.

In general, the apparatus 10 includes means for atomizing the liquid feed with a stream of gas which preferably is steam. Herein, the atomizing means are of the same general type as disclosed in Haruch et al U.S. Pat. No. 4,349,156. Such means are shown somewhat schematically in FIG. 1 and comprise a body 11 defining an internal preatomizing chamber 12. An elongated impingement pin 13 is located in the chamber with its end positioned approximately at the center of the chamber. Pressurized liquid feed is introduced into the chamber via an inlet port 15 in the body 11 from a liquid supply 17. The stream of liquid strikes an impingement area within the chamber 12, which in this case is an end face of the pin 12 and is mechanically shattered into small droplets. At the same time, a pressurized jet of steam is introduced into the chamber from a steam supply 18 by way of an inlet port 14. The steam blows transversely across and around the pin, striking the liquid droplets splashing off of the pin so as to cause the liquid droplets to be further atomized into fine particles.

Attached to the body 11 and located downstream of the outlet 16 of the chamber 12 is a nozzle 20 for spraying the atomized liquid feed and the entrained steam into the reactor. Herein, the nozzle includes an elongated and generally cylindrical body 21 having a downstream end 22 which defines a discharge end. The discharge end 22 of the nozzle is generally hemispherical and thus includes a convex outer surface and a concave inner surface. Such surfaces conform generally in shape to the shape of a section of a sphere having a geometric center lying on the longitudinal axis of the body 21 of the nozzle 20, such spherical section defines a nozzle chamber sized smaller than the diameter of the cylindrical body 21 so as to preclude expansion of the pre-atomized flow stream and the agglomeration of the finely pre-atomized liquid particles.

In accordance with the present invention, the discharge end 22 of the nozzle 20 is formed with a plurality of discharge orifices 25 which are located on opposite sides of the axis of the nozzle and which are elongated in a direction extending transversely of the axis. By virtue of the discharge end of the nozzle having a plurality of outlet orifices, the mixture discharged from the nozzle is atomized more finely than is the case of a nozzle having a single discharge orifice of comparable area centered on the axis of the nozzle. As a result of the finer atomization effected by the multiple orifices, the efficiency of the apparatus 10 is increased in that a given volume of liquid may be broken into particles having a relatively high surface area even though steam is supplied to the apparatus at a comparatively low volumetric flow rate.

In the embodiment of FIGS. 1 and 2, two elongated outlet orifices 25 are formed in the discharge end 22 of the nozzle 20. The orifices are located on opposite sides of and are spaced equidistantly from the axis of the nozzle and, as pointed out above, are elongated in a direction extending transversely of the nozzle. FIGS. 1 and 2 represent the most advantageous version of the nozzle and, in this embodiment, the orifices 25 are angled toward one another so as to cause the streams sprayed from the nozzle to converge upon progressing away from the discharge end of the nozzle. In this way, the streams impact against one another to effect still further atomization immediately outside the nozzle. Each orifice preferably is inclined at an angle up to about ten degrees relative to the axis of the nozzle.

The discharge orifices 25 may be formed in the discharge end 22 of the nozzle 20 by a milling cutter. Because of the hemispherical shape of the discharge end, slotting of the discharge end with a milling cutter inclined at an angle up to about ten degrees causes the upper orifice to appear generally V-shaped and to cause the lower orifice to appear generally as an inverted V when the orifices are viewed from the end of the nozzle as in FIG. 2.

Further efficiency may be imparted to the nozzle by providing a sharp edged annular shoulder 26 at the junction between the body 21 and the discharge end 22. The shoulder is created through the provision of a body whose internal diameter is slightly greater than the internal diameter of the discharge end. The shoulder produces turbulence in the mixture as the mixture approaches the orifices 25 and effects further atomization of the liquid feed.

In the nozzle 20' shown in FIGS. 3 and 4, the orifices 25' are angled such that the streams of atomized liquid discharged through the orifices diverge away from one another upon progressing downstream from the nozzle. This arrangement produces higher efficiency than a nozzle with a single elongated orifice of comparable area but the efficiency is not as great as that achieved with the nozzle 20 of FIGS. 1 and 2.

The following table of data resulting from comparative tests demonstrates the increased efficiency obtained from the nozzle 20' with two diverging orifices 25' when compared to an identical nozzle with a single orifice:

| Nozzle Configuration | Eq. Wt. Steam % | Liquid Pressure (psi) | Steam Pressure (psi) | Sauter Mean Diameter | Volume Median Diameter |
| --- | --- | --- | --- | --- | --- |
| Single Orifice | 3.5 | 50 | 90 | 149 | 198 |
|  | 3.5 | 100 | 90 | 143 | 187 |
|  | 3.5 | 150 | 90 | 141 | 184 |
|  | 3.5 | 200 | 90 | 137 | 178 |
| Double Orifices | 3.26 | 50 | 90 | 133 | 144 |
| 10° diverging | 3.26 | 100 | 90 | 119 | 128 |
|  | 3.26 | 150 | 90 | 114 | 122 |
|  | 3.0 | 200 | 90 | 111 | 119 |
| Single Orifice | 7.0 | 50 | 90 | 114 | 121 |
|  | 7.0 | 100 | 90 | 113 | 121 |
|  | 7.0 | 150 | 90 | 112 | 120 |
|  | 7.0 | 200 | 90 | 111 | 118 |

In the above table, "Eq. Wt. Steam %" represents the percentage by weight of steam supplied to the apparatus 10 with respect to the weight of supplied liquid based upon the flow rate of the liquid. In carrying out the comparative tests at various liquid pressures, the flow rate of liquid to the apparatus 10 was kept constant at all pressures by progressively decreasing the area of the inlet orifice 15 for progressively increasing pressures.

By comparing the top four rows of data with the middle four rows, it will be apparent that the nozzle 20' with the two diverging orifices 25' effected atomization of the liquid into significantly smaller particles than a nozzle with a single orifice even though the two nozzles were supplied with substantially equal quantities of steam. The enhanced efficiency of the nozzle 20' is demonstrated further by a comparison of the middle four rows of data with the bottom four rows where it will be seen that the nozzle 20' with two diverging orifices 25' achieved substantially the same particle size as a nozzle with a single orifice even though the single-orifice nozzle was supplied with more than twice the quantity of steam.

In the nozzle 20" of FIGS. 5 and 6, the two orifices 25" are not angled but instead extend parallel to one another. As a result, parallel streams of atomized liquid tend to be discharged from the orifices. The nozzle 20" is not as efficient as the nozzle 20' but still is more efficient than prior FCC nozzles having a single orifice of comparable area.

I claim:

1. A fluidized catalytic cracking apparatus comprising a riser through which gases are directed, a supply of hydrocarbon liquid, a supply of steam, a spray device mounted in said riser, said spray device including an atomizer section having inlets through which pressurized streams of hydrocarbon liquid and steam are directed from said hydrocarbon liquid supply and said steam supply, said atomizer section defining an impingement surface for causing the turbulent intermixing of said liquid hydrocarbon and steam flow streams and the pre-atomization of the liquid hydrocarbon into fine particles, said atomizer section having an outlet for the atomized hydrocarbon liquid, a nozzle having a tubular body communicating with said outlet, said body having a central axis and having a discharge end with a convex outer surface and a concave inner surface, said discharge end conforming generally in shape to the shape of a section of a sphere having a geometric center lying on said axis, two elongated discharge orifices formed through said discharge end, said orifices being located on opposite sides of and being spaced substantially equidistantly from said axis and being elongated in a direction extending transversely of said axis, and said spherical discharge end being sized no greater than the diameter of said tubular body for preventing expansion of atomized hydrocarbon liquid within said discharge end of said nozzle body prior to discharge through said orifices.

2. Apparatus as defined in claim 1 in which said orifices are angled such that streams of atomized liquid discharged through said orifices converge toward one another upon progressing away from said discharge end of said nozzle.

3. Apparatus as defined in claim 1 in which said orifices are angled such that streams of atomized liquid discharged through said orifices diverge away from one another upon progressing away from said discharge end of said nozzle.

4. Apparatus as defined in claim 1 in which said orifices extend parallel to one another such that parallel streams of atomized liquid tend to be discharged from said orifices.

5. Apparatus as defined in claim 1 in which said body is of circular cross-section, the internal diameter of said body adjacent said discharge end being greater than the internal diameter of said discharge end whereby a sharp edged annular shoulder is defined within said nozzle at the junction of said body and said discharge end.

6. Apparatus as defined in claim 1 in which said atomizer section defines an impingement surface against which the pressurized liquid hydrocarbon stream is directed.

7. A fluidized catalytic cracking apparatus comprising a riser through which gases are directed, a supply of hydrocarbon liquid, a supply of steam, a spray device mounted in said riser, said spray device including an atomizer section having inlets through which pressurized streams of hydrocarbon liquid and gas are directed from said hydrocarbon liquid supply and said steam supply, said atomizer section defining an impingement surface for causing the turbulent intermixing of said liquid hydrocarbon and steam flow streams and the pre-atomization of the liquid hydrocarbon into fine particles, said atomizer section having an outlet for the atomized hydrocarbon liquid, a nozzle having a tubular body communicating with said outlet, said body having a central axis and having a discharge end with a convex outer surface and a concave inner surface, said discharge end conforming generally in shape to the shape of a section of a sphere having a geometric center lying on said axis, a plurality of discharge orifices formed through said discharge end and elongated in a direction extending transversely of said axis, half of said plurality of orifices being located on one side of said axis, the other half of said plurality of orifices being located on the opposite side of said axis, and said spherical discharge end being sized no greater than the diameter of said tubular body for preventing expansion of atomized hydrocarbon liquid within said discharge end of said nozzle body prior to discharge through said orifices.

* * * * *